(12) United States Patent
Yokochi et al.

(10) Patent No.: US 12,399,336 B2
(45) Date of Patent: Aug. 26, 2025

(54) OPTICAL FIBER CABLE WITH PARTITIONED CASE FOR OPTICAL FIBER CABLE

(71) Applicant: SUMITOMO ELECTRIC INDUSTRIES, LTD., Osaka (JP)

(72) Inventors: Takayuki Yokochi, Osaka (JP);
Kenichiro Otsuka, Osaka (JP);
Takayuki Shimazu, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 151 days.

(21) Appl. No.: 18/059,001

(22) Filed: Nov. 28, 2022

(65) Prior Publication Data
US 2023/0176307 A1 Jun. 8, 2023

(30) Foreign Application Priority Data

Dec. 3, 2021 (JP) .................................. 2021-197035

(51) Int. Cl.
*G02B 6/44* (2006.01)
(52) U.S. Cl.
CPC ......... *G02B 6/4447* (2013.01); *G02B 6/4482* (2013.01)
(58) Field of Classification Search
None
See application file for complete search history.

(56) References Cited

U.S. PATENT DOCUMENTS

| | | | | |
|---|---|---|---|---|
| 5,125,060 A | * | 6/1992 | Edmundson | G02B 6/4473 385/100 |
| 6,466,725 B2 | * | 10/2002 | Battey | G02B 6/566 385/100 |
| 6,810,194 B2 | * | 10/2004 | Griffiths | G02B 6/4454 385/53 |
| 7,127,143 B2 | | 10/2006 | Elkins, II et al. | |
| 7,266,274 B2 | * | 9/2007 | Elkins, II | G02B 6/4473 385/100 |
| 7,277,614 B2 | * | 10/2007 | Cody | G02B 6/3807 385/100 |
| 7,346,243 B2 | | 3/2008 | Cody et al. | |
| 7,349,605 B2 | * | 3/2008 | Noonan | G02B 6/4472 385/115 |
| 7,422,378 B2 | * | 9/2008 | Lu | G02B 6/4475 385/103 |

(Continued)

FOREIGN PATENT DOCUMENTS

| | | |
|---|---|---|
| CN | 105629405 A | 6/2016 |
| JP | 2001-051131 A | 2/2001 |

(Continued)

*Primary Examiner* — Andrew Jordan
(74) *Attorney, Agent, or Firm* — MCDONALD HOPKINS LLC

(57) ABSTRACT

An optical fiber cable includes a plurality of first optical fiber cords including a trunk optical fiber cord and a branch optical fiber cord, a second optical fiber cord connected to the branch optical fiber cord, and a case covering a part of the plurality of first optical fiber cords and a part of the second optical fiber cord, where the case includes a first tube portion through which a trunk optical fiber cord is passed, a second tube portion adjacent to the first tube portion and through which a branch optical fiber cord is passed, and a partition wall partitioning the first tube portion and the second tube portion.

8 Claims, 7 Drawing Sheets

(56) References Cited

U.S. PATENT DOCUMENTS

| | | | | |
|---|---|---|---|---|
| 7,454,106 B2* | 11/2008 | Cobb, III | G02B 6/4475 |
| | | | 385/100 |
| 7,532,799 B2* | 5/2009 | Gronvall | G02B 6/4475 |
| | | | 385/100 |
| 7,565,055 B2* | 7/2009 | Lu | G02B 6/4475 |
| | | | 430/311 |
| 7,693,374 B2 | 4/2010 | Cody et al. | |
| 7,769,261 B2* | 8/2010 | Lu | G02B 6/4475 |
| | | | 385/100 |
| 7,840,109 B2* | 11/2010 | Lu | G02B 6/4475 |
| | | | 385/100 |
| 8,582,938 B2 | 11/2013 | Cody et al. | |
| 8,814,446 B2* | 8/2014 | Labraymi | G02B 6/2558 |
| | | | 385/100 |
| 10,107,980 B1* | 10/2018 | Debban | G02B 6/4404 |
| 10,120,155 B2* | 11/2018 | Kishimoto | G02B 6/4472 |
| 10,371,917 B2 | 8/2019 | Cooke et al. | |
| 10,437,003 B2* | 10/2019 | Jensen | G02B 6/4475 |
| 10,598,888 B2* | 3/2020 | Sato | G02B 6/44 |
| 10,712,519 B2* | 7/2020 | Faulkner | G02B 6/4476 |
| 10,725,261 B2* | 7/2020 | Kobayashi | G02B 6/4431 |
| 11,256,055 B2* | 2/2022 | Cremer et al. | G02B 6/4459 |
| 11,493,698 B2* | 11/2022 | Ishiguro | G02B 6/3849 |
| 11,624,875 B2* | 4/2023 | Ho | G02B 6/3849 |
| | | | 385/139 |
| 11,681,101 B2* | 6/2023 | Wurst | G02B 6/3564 |
| | | | 385/99 |
| 11,815,723 B2* | 11/2023 | Omura | G02B 6/3847 |
| 11,982,856 B2* | 5/2024 | Gill | G02B 6/4473 |
| 12,032,214 B2* | 7/2024 | Yokochi | G02B 6/4471 |
| 12,153,272 B2* | 11/2024 | Crawford | G02B 6/562 |
| 12,210,205 B2* | 1/2025 | Tanaka | G02B 6/506 |
| 12,259,585 B2* | 3/2025 | Gniadek | G02B 6/3895 |
| 2002/0064364 A1* | 5/2002 | Battey | G02B 6/566 |
| | | | 385/100 |
| 2017/0343759 A1* | 11/2017 | Kishimoto | G02B 6/4471 |
| 2018/0329167 A1* | 11/2018 | Kobayashi | G02B 6/443 |
| 2019/0204519 A1* | 7/2019 | Sato | G02B 6/448 |
| 2021/0116642 A1* | 4/2021 | Wurst | G02B 6/2558 |
| 2021/0247572 A1* | 8/2021 | Ho | G02B 6/3874 |
| 2021/0333482 A1* | 10/2021 | Ishiguro | G02B 6/3869 |
| 2022/0043226 A1* | 2/2022 | Andrus | G02B 6/4413 |
| 2023/0125413 A1* | 4/2023 | Omura | G02B 6/3672 |
| 2023/0176299 A1* | 6/2023 | Yokochi | G02B 6/4471 |
| | | | 385/89 |
| 2023/0176306 A1* | 6/2023 | Yokochi | G02B 6/4403 |
| | | | 385/114 |
| 2023/0176307 A1* | 6/2023 | Yokochi | G02B 6/4447 |
| | | | 385/114 |
| 2023/0176312 A1* | 6/2023 | Tanaka | G02B 6/46 |
| | | | 405/183.5 |
| 2023/0194797 A1* | 6/2023 | Gniadek | G02B 6/3831 |
| | | | 385/78 |
| 2023/0358986 A1* | 11/2023 | Yokochi | G02B 6/4457 |
| 2024/0027696 A1* | 1/2024 | Omura | G02B 6/3823 |
| 2024/0045164 A1* | 2/2024 | Crawford | G02B 6/4453 |
| 2024/0126031 A1* | 4/2024 | Shimazu | G02B 6/44524 |
| 2024/0369781 A1* | 11/2024 | Taira | G02B 6/3888 |
| 2025/0110306 A1* | 4/2025 | Tomlinson | G02B 6/54 |

FOREIGN PATENT DOCUMENTS

| | | |
|---|---|---|
| JP | 2001-116968 A | 4/2001 |
| JP | 2001-201641 A | 7/2001 |
| JP | 2003-295019 A | 10/2003 |
| JP | 2005-043406 A | 2/2005 |
| JP | 2005-208193 A | 8/2005 |
| JP | 2012-053131 A | 3/2012 |

* cited by examiner

OPTICAL FIBER CABLE WITH PARTITIONED CASE FOR OPTICAL FIBER CABLE

TECHNICAL FIELD

The present disclosure relates to an optical fiber cable and a case for an optical fiber cable.

The present application claims priority to Japanese Patent Application No. 2021-197035 filed on Dec. 3, 2021, the entire contents of which are incorporated herein by reference.

BACKGROUND

Japanese Unexamined Patent Publication Nos. 2001-51131, 2001-116968, and 2001-201641, and U.S. Pat. Nos. 7,127,143, 7,346,243, 7,693,374, 8,582,938, 10,437,003, and 10,712,519 each disclose various optical fiber cables used in optical communication. Japanese Unexamined Patent Publication No. 2005-208193 discloses an optical microbox for connecting a branch cable branched from an optical trunk cable and a termination cable. U.S. Pat. No. 10,371,917 discloses a data center comprising an optical fiber or the like.

SUMMARY

An optical fiber cable according to an aspect of the present disclosure includes a plurality of first optical fiber cords including a trunk optical fiber cord and a branch optical fiber cord, a second optical fiber cord connected to the branch optical fiber cord, and a case covering a portion of the plurality of first optical fiber cords and a portion of the second optical fiber cord. The case includes a first tube portion through which a trunk optical fiber cord is passed, a second tube portion adjacent to the first tube portion and through which a branch optical fiber cord is passed, and a partition wall partitioning the first tube portion and the second tube portion.

DETAILED DESCRIPTION

Figure 1:
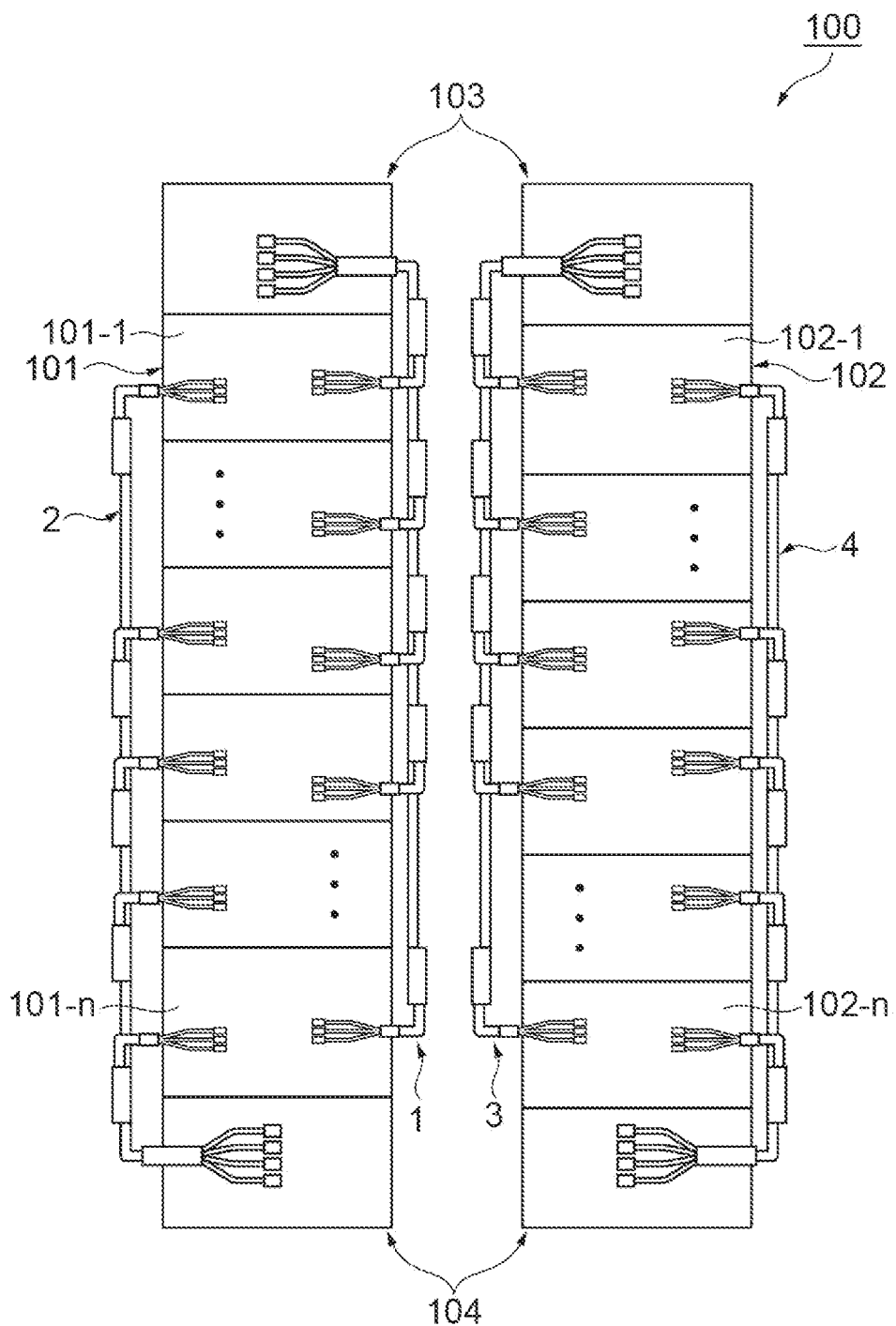
FIG. 1 is a schematic plan view illustrating an optical communication system including an optical fiber cable according to an embodiment.

Problems to be Solved by the Present Disclosure

In a data center or the like as described in U.S. Pat. No. 10,371,917, for example, an optical cable including a plurality of optical fiber cords (tethers) as shown in U.S. Pat. No. 10,437,003 is used. If necessary, an optical fiber cord is branched from the optical cable. A branched optical fiber cord (especially, a position branched from an optical cable, or the like) is likely to be easily damaged than the trunk line. Therefore, there is a demand for an optical fiber cable and a case for an optical fiber cable capable of suppressing damage to an optical fiber cord branched from a trunk line.

Effects of the Present Disclosure

According to the present disclosure, it is possible to provide an optical fiber cable and an optical fiber cable case capable of suppressing damage to an optical fiber cord branched from a trunk line.

Description of Embodiments of the Present Disclosure

First, contents of embodiments of the present disclosure will be listed and described.

An embodiment of the present disclosure is an optical fiber cable including: a plurality of first optical fiber cords including a trunk optical fiber cord and a branch optical fiber cord; a second optical fiber cord connected to the branch optical fiber cord; and a case covering a part of the plurality of first optical fiber cords and a part of the second optical fiber cord, where the case includes: a first tube portion through which the trunk optical fiber cord is passed; a second tube portion adjacent to the first tube portion and through which the branch optical fiber cord is passed; and a partition wall partitioning the first tube portion and the second tube portion, wherein an optical connecting portion of the branch optical fiber cord and the second optical fiber cord is accommodated in the second tube portion, a first end of the second tube portion is located between a first end of the first tube portion and a second end of the first tube portion, the first end of the second tube portion communicating with an interior space of the first tube portion, and the partition wall extends from the first end of the second tube portion to a second end of the second tube portion.

According to this optical fiber cable, since the partition wall extending from the first end of the second tube portion to the second end of the second tube portion is provided, the trunk optical fiber cord and the branch optical fiber cord can be separated from each other in the case. Thus, interference between the trunk optical fiber cord and the branch optical fiber cord in the case can be suppressed. In addition, since the first end of the second tube portion communicates with the interior space of the first tube portion, a branch start position of the branch optical fiber cord can be covered by the case. Accordingly, since the branch start position can be favorably protected by the case, it is possible to suppress damage to the branch optical fiber cord branched from the trunk optical fiber cord.

The optical fiber cable may further include: a first tube located at least outside the case, the first tube covering the plurality of first optical fiber cords; a second tube located at least outside the case, the second tube covering the second optical fiber cord; a first resin member surrounding at least the first end of the first tube portion; and a second resin member surrounding at least the second end of the first tube portion and the second end of the second tube portion, where the first resin member may be in contact with at least a first part of the case and a part of the first tube, and the second resin member may be in contact with at least a second part of the first tube, and a part of the second tube. In this case, the resin member can suppress rattling of the case in the optical fiber cable.

Each of the first resin member and the second resin member may have a thermal shrinkage property.

The case may further include a body including the first tube portion, the second tube portion, and the partition wall, and the body may be an assembly structure of a first main body portion and a second main body portion, the first main body portion defining a first part of the first tube portion, a first part of the second tube portion, and a first part of the partition wall, and the second main body portion defining a second part of the first tube portion, a second part of the second tube portion, and a second part of the partition wall. In this case, the case can easily accommodate the optical fiber cable and the optical fiber cord.

The case may further include a connecting portion connecting the first main body portion and the second main body portion. In this case, the first main body portion and the second main body portion can be easily assembled.

The optical fiber cable may further include a sleeve covering the optical connecting portion, and an outer face of the sleeve may be sandwiched by the second tube portion. In this case, since a movement of the optical connecting portion in the second tube portion can be suppressed, the optical connecting portion is less likely to be damaged.

A projection located between the first end and the second end of the second tube portion may be provided on an inner wall of the second tube portion, and the projection may be in contact with the outer face. In addition, the projection may have elasticity. In this case, it is possible to suppress damage to the part of the sleeve that is in contact with the projection.

An embodiment of the present disclosure is a case for an optical fiber cable, the case including: a first tube portion extending in a first direction; a second tube portion extending in the first direction, the second tube portion being adjacent to the first tube portion in a second direction orthogonal to the first direction; and a partition wall partitioning the first tube portion and the second tube portion, where an inner diameter of the first tube portion is larger than an inner diameter of the second tube portion, a first end of the second tube portion is located between a first end of the first tube and a second end of the first tube portion in the first direction, the first end of the second tube portion communicating with an interior space of the first tube portion, a second end of the second tube portion is located closer to the second end of the first tube portion than the first end of the second tube portion in the first direction, and the partition wall extends from the first end of the second tube portion to the second end of the second tube portion in the first direction.

According to this case, since the inner diameter of the first tube portion is larger than the inner diameter of the second tube portion, for example, the first tube portion can accommodate an optical fiber cable as a trunk line, and the second tube portion can accommodate an optical fiber cord branched from the optical fiber cable. Here, since the partition wall extending from the first end of the second tube portion to the second end of the second tube portion in the first direction is provided, the optical fiber cable and the optical fiber cord can be separated from each other in the case. Thus, it is possible to suppress interference between the optical fiber cable and the optical fiber cord in the case. In addition, since the first end of the second tube portion communicates with the interior space of the first tube portion, the branch start position of the optical fiber cord can be covered by the case. Accordingly, since the branch start position can be favorably protected by the case, it is possible to suppress breakage of the optical fiber cord branched from the optical fiber cable.

A projection located between the first end and the second end of the second tube portion in the first direction may be provided on an inner wall of the second tube portion. In this case, since the optical fiber cord in the second tube portion is in contact with the projection, the movement of the optical fiber cord in the second tube portion can be suppressed.

The projection may be elastic. In this case, damage to a part of the optical fiber cord in contact with the projection can be suppressed.

Details of Embodiment of the Present Disclosure

Specific examples of an optical fiber cable and a case for an optical fiber cable according to an embodiment of the present disclosure will be described below with reference to the drawings. It should be noted that the present disclosure is not limited to these examples, but is defined by the scope of claims and is intended to include all modifications within the meaning and scope equivalent to the scope of claims. In the following description, the same reference numerals are given to the same elements in the description of the drawings, and redundant description will be omitted.

FIG. 1 is a schematic plan view illustrating an optical communication system including an optical fiber cable according to the present embodiment. An optical communication system 100 illustrated in FIG. 1 is a group of devices provided in a data center, a base station, or the like, and includes a server rack group 101, 102, a distribution frame 103, 104, and optical fiber cables 1 to 4.

Each server rack group 101, 102 is formed by arranging n server racks (n is a natural number of 2 or more) in order in a predetermined direction. The server rack group 101 includes a plurality of server racks 101-1 to 101-n arranged in one direction in a plan view. Each of the server racks 101-1 to 101-n is a rack on which a plurality of physical servers (not illustrated) are placed. Each of the server racks 101-1 to 101-n is provided with a plurality of shelves (not shown) arranged in a vertical direction. A physical server or the like is placed on each of the plurality of shelves. Like the server rack group 101, the server rack group 102 includes a plurality of server racks 102-1 to 102-n arranged in one direction in a plan view.

Each of the distribution frames 103, 104 is a line concentrator that accommodates a communication line (optical fiber cable) used in the optical communication system 100. External multi-core cables (not shown) connected to each of the distribution frames 103, 104 are respectively divided and arranged into a plurality of communication lines. In the distribution frames 103, 104, termination processing of optical fiber cables may be performed. A termination unit that holds the multi-core optical wiring and accommodates connection points may be mounted on the distribution frames 103, 104. In the present embodiment, each of the distribution frames 103, 104 is an intermediate distribution frame (IDF), but is not limited thereto. In addition, the distribution frame 103 is connected to an external multi-core cable (not illustrated) which is a working line, and the distribution frame 104 is connected to an external multi-core cable (not illustrated) which is a spare line.

The optical fiber cable 1 is a multi-core cable connecting the server rack group 101 and the distribution frame 103. Similarly, the optical fiber cable 2 is a multi-core cable connecting the server rack group 101 and the distribution frame 104, the optical fiber cable 3 is a multi-core cable connecting the server rack group 102 and the distribution frame 103, and the optical fiber cable 4 is a multi-core cable connecting the server rack group 102 and the distribution frame 104. The optical fiber cables 1 and 3 are used as working lines, and the optical fiber cables 2 and 4 are used as protection lines. The optical fiber cables 1 to 4 may have the same structure or may have different structures.

Figure 2:
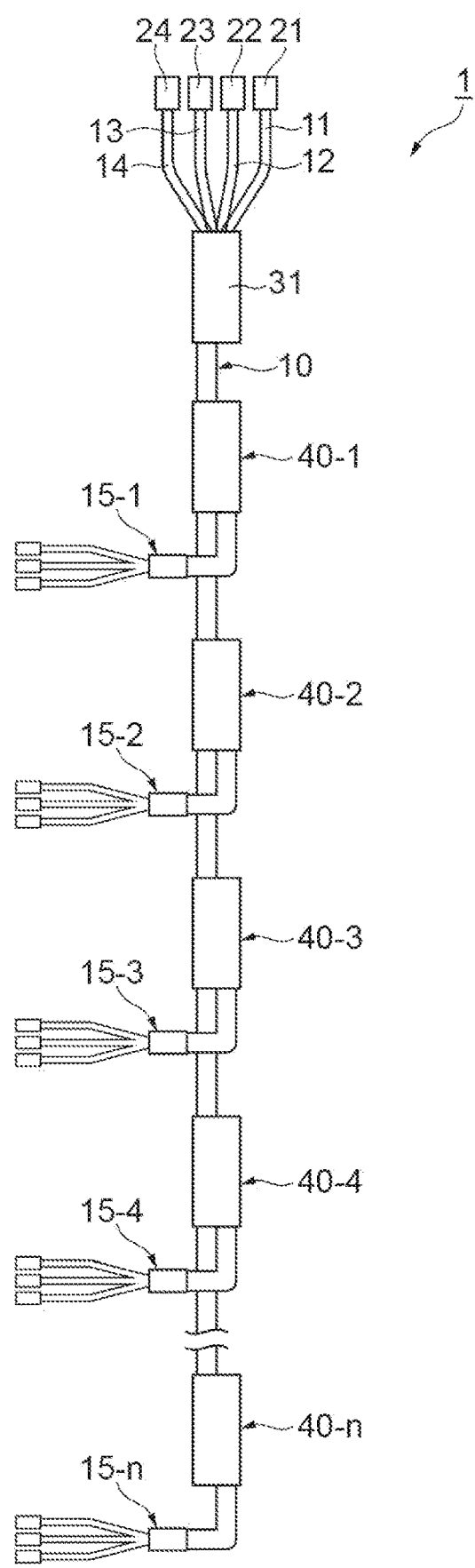
FIG. 2 is a schematic plan view illustrating a main part of the optical fiber cable shown in FIG. 1.

FIG. 2 is a schematic plan view illustrating the optical fiber cable 1 shown in FIG. 1. As illustrated in FIG. 2, the optical fiber cable 1 includes a trunk cable 10, multicore optical fiber cords 11 to 14, branch optical fiber cables 15-1 to 15-n (n is a natural number of 2 or more), connectors 21 to 24, a branch member 31, and branch protection cases 40-1 to 40-n. Here, the branch optical fiber cables 15-1 to 15-n have the same structure each other, and the branch protection cases 40-1 to 40-n have the same structure each other. Therefore, hereinafter, the details of the optical fiber cable 15-1 among the branch optical fiber cables 15-1 to 15-n and the details of the branch protection case 40-1 among the branch protection cases 40-1 to 40-n will be described.

Figure 3:
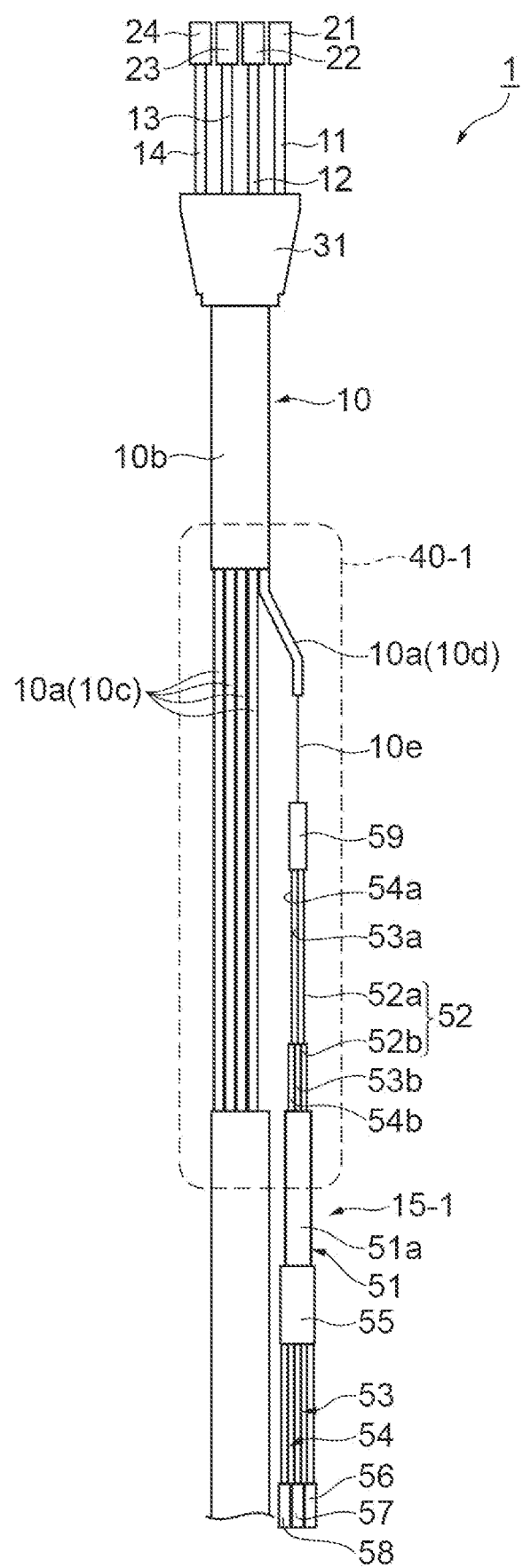
FIG. 3 is a schematic cross sectional view illustrating a part of an optical fiber cable.

FIG. 3 is a schematic diagram illustrating a main part of an optical fiber cable. In FIG. 3, the branch protection case 40-1 is omitted. As shown in FIG. 3, the trunk cable 10 is a main portion located between the server rack group 101 and the distribution frame 103 in an extending direction of the optical fiber cable 1. One end of the trunk cable 10 is accommodated in the branch member 31. The trunk cable 10 includes a plurality of optical fiber cords 10a (first optical fiber cords) and a reinforced tube 10b (a first tube) covering the optical fiber cords 10a.

Each of the plurality of optical fiber cords 10a is, for example, a cord including a plurality of core wires. In the present embodiment, the optical fiber cord 10a is a six core cord, but is not limited thereto. The lengths of the plurality of optical fiber cords 10a may be predetermined or may be equal to each other. The reinforced tube 10b is a member that bundles and protects a plurality of optical fiber cords 10a. A part of the reinforced tube 10b in the branch protection case 40-1 is removed. Therefore, the reinforced tube 10b is located at least outside the branch protection case 40-1.

Hereinafter, among the plurality of optical fiber cords 10a in FIG. 3, the trunk line accommodated in the reinforced tube 10b is referred to as a trunk optical fiber cord 10c, and the branch line branching from the trunk optical fiber cord 10c is referred to as a branch optical fiber cord 10d. A part of the trunk optical fiber cord 10c may be exposed from the reinforced tube 10b. This part is accommodated in the branch protection case 40-1. The branch optical fiber cord 10d corresponds to a part of the branch optical fiber cable 15-1. A core wire 10e (first core wire) included in the branch optical fiber cord 10d is exposed at a distal end portion of the branch optical fiber cord 10d. The distal end portion is accommodated in the branch protection case 40-1.

Each of the multicore optical fiber cords 11 to 14 is a communication line located between the distribution frame 103 and the branch member 31 in the extending direction of the optical fiber cable 1. Each of the multicore optical fiber cords 11 to 14 is a cord including more core wires than the optical fiber cord 10a. The number of core wires included in each of the multicore optical fiber cords 11 to 14 may be equal to a multiplier of the number of optical fiber cords 10a included in one multicore optical fiber cord and the number of core wires included in the optical fiber cord 10a. In the present embodiment, each of the multicore optical fiber cords 11 to 14 is a 24-core cord, and thus includes four optical fiber cords 10a. One end of each of the multicore optical fiber cords 11 to 14 is accommodated in the branch member 31. The other end of the multicore optical fiber cord 11 is accommodated in the connector 21. Similarly, the other ends of the multicore optical fiber cords 12 to 14 are accommodated in connectors 22 to 24, respectively. Each of the multicore optical fiber cords 11 to 14 is reinforced by, for example, a reinforced tube.

Each of the connectors 21 to 24 is an interface connected to the distribution frame 103. Each of the connectors 21 to 24 is, for example, a multi-fiber push-on (MPO) connector. In this case, the number of optical fibers coupled to the connector 21 corresponds to the number of optical fibers included in the multicore optical fiber cord 11. The same applies to the connectors 22 to 24.

The branch member 31 is a member that accommodates a portion branched from the multicore optical fiber cords 11 to 14 to optical fiber cords 10a. A cavity is provided in the branch member 31, and one end of the multicore optical fiber cords 11 to 14 and one end of the optical fiber cords 10a are accommodated in the cavity. In the branch member 31, the respective positions of the multicore optical fiber cords 11 to 14 and the respective positions of the optical fiber cords 10a may be determined. In the branch member 31, the core wires in the multicore optical fiber cords 11 to 14 are exposed by removing the reinforced tubes or the like provided on the multicore optical fiber cords 11 to 14. The core wires are bundled as a core wire of each optical fiber cord 10a. In this case, the branch member 31 also functions as a protective member for the core wire. In addition, since there is no fusion spliced portion between the multicore optical fiber cords 11 to 14 and the optical fiber cords 10a, optical loss is less likely to occur in the branch member 31. In the branch member 31, the positions of each optical fiber cord 10a and the positions of the multicore optical fiber cords 11 to 14 may be determined. In the branch member 31, a fusion spliced portion of the multicore optical fiber cord 11 and the optical fiber cords 10a may be provided. In this case, the branch member 31 also functions as a protection member for the fusion spliced portion or the like.

Each of the branched optical fiber cables 15-1 to 15-n is a communication line connected to the server rack group 101. As illustrated in FIG. 3, the branch optical fiber cable 15-1 includes a branch optical fiber cord 10d, a branch trunk cable 51, optical fiber cords 52 to 54 (second optical fiber cords), a protection member 55, connectors 56 to 58, and a sleeve 59. The branch trunk cable 51 is a trunk line in the branch optical fiber cable 15-1 and is optically connected to the optical fiber cord 10a. Therefore, the branch trunk cable 51 before the optical connection is a line separate from the trunk cable 10. The branch trunk cable 51 has a reinforced tube 51a (second tube) that accommodates the optical fiber cords 52 to 54. A part of the reinforced tube 51a is removed in the branch protection case 40-1. Therefore, the reinforced tube 51a is located at least outside the branch protection case 40-1.

Each of the optical fiber cords 52 to 54 is a cord accommodated in the branch trunk cable 51 and is optically connected to the branch optical fiber cord 10d. One ends of the optical fiber cords 52 to 54 are accommodated in the branch protection case 40-1. The other ends of the optical fiber cords 52 to 54 are connected to connectors 56 to 58, respectively. The optical fiber cord 52 includes a core wire 52a (second core wire) whose number is lower than number of core wires in the optical fiber cord 10a, and a tube 52b covering the core wire 52a. Each of the optical fiber cords 53, 54 has the same structure as the optical fiber cord 52.

Therefore, the optical fiber cord 53 includes a core wire 53a and a tube 53b, and the optical fiber cord 54 includes a core wire 54a and a tube 54b.

A part of the core wire 52a is exposed from the reinforced tube 51a in the branch protection case 40-1. The same applies to core wires 53a and 54a. The exposed core wires 52a, 53a, and 54a are respectively fusion spliced to the core wires 10e in the branch protection case 40-1. For example, the core wires 52a, 53a, and 54a fixed in alignment with each other and the core wires 10e fixed in alignment with each other are fusion spliced to each other. The total number of core wires 52a to 54a corresponds to the number of core wires included in the branch optical fiber cord 10d. In the present embodiment, each of the optical fiber cords 52 to 54 includes two core wires. A part of the tube 52b is exposed between the protection member 55 and the connector 56. Another part of the tube 52b is exposed from the reinforced tube 51a in the branch protection case 40-1. The same applies to the tubes 53b, 54b.

The protection member 55 is a member for protecting a portion branched from the branch trunk cable 51 to the optical fiber cords 52 to 54.

Each of the connectors 56 to 58 is an interface connected to the server rack group 101. Each of the connectors 56 to 58 is, for example, a data link connector. The number of optical fibers coupled to the connector 56 corresponds to the number of optical fibers included in the optical fiber cord 52. The same applies to the connectors 57, 58.

The sleeve 59 is a cylindrical member that protects an optical connecting portion connecting the branch optical fiber cord 10d and the optical fiber cords 52 to 54. The sleeve 59 is, for example, a resin member formed so as to cover the optical connecting portion. An outer face 59a of the sleeve 59 may contact the branch protection case 40-1. In the present embodiment, the optical connecting portion is a fusion spliced portion.

Figure 4A:
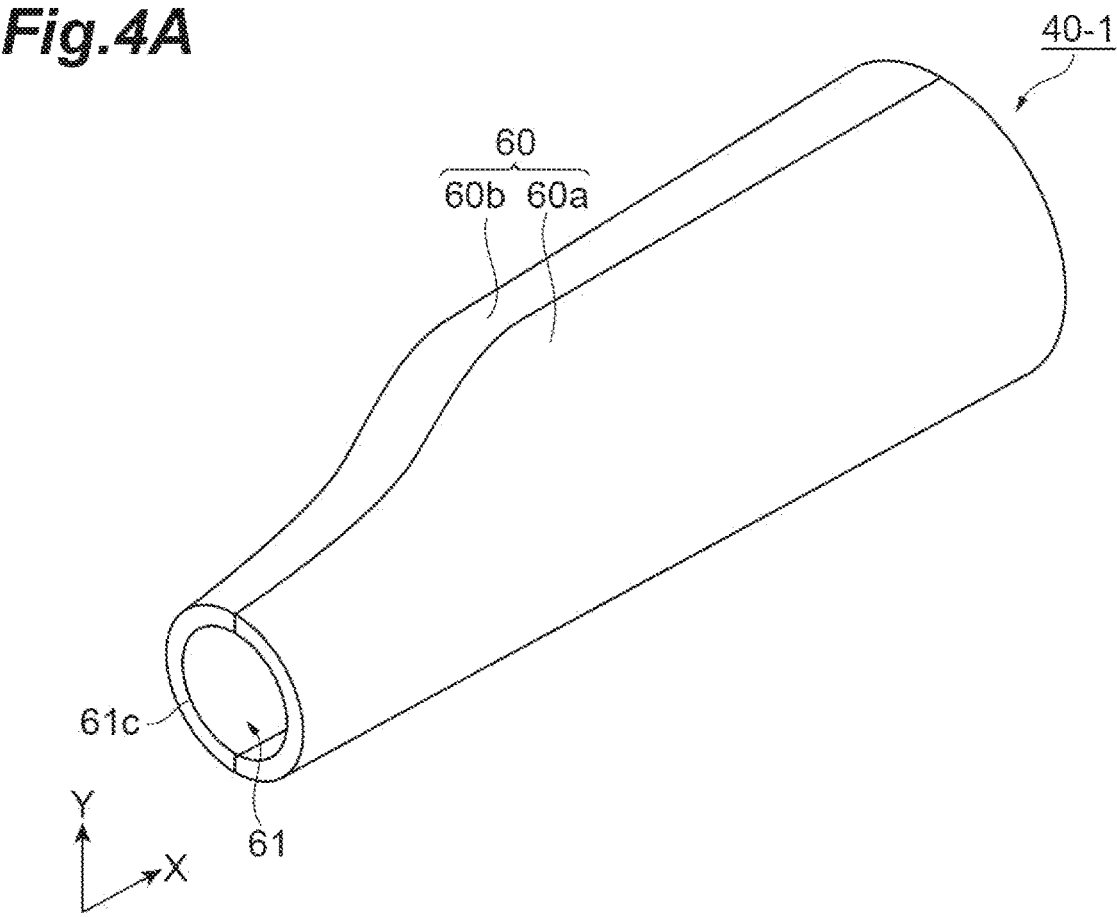
FIG. 4A is a schematic perspective view illustrating a branch protection case.
Figure 4B:
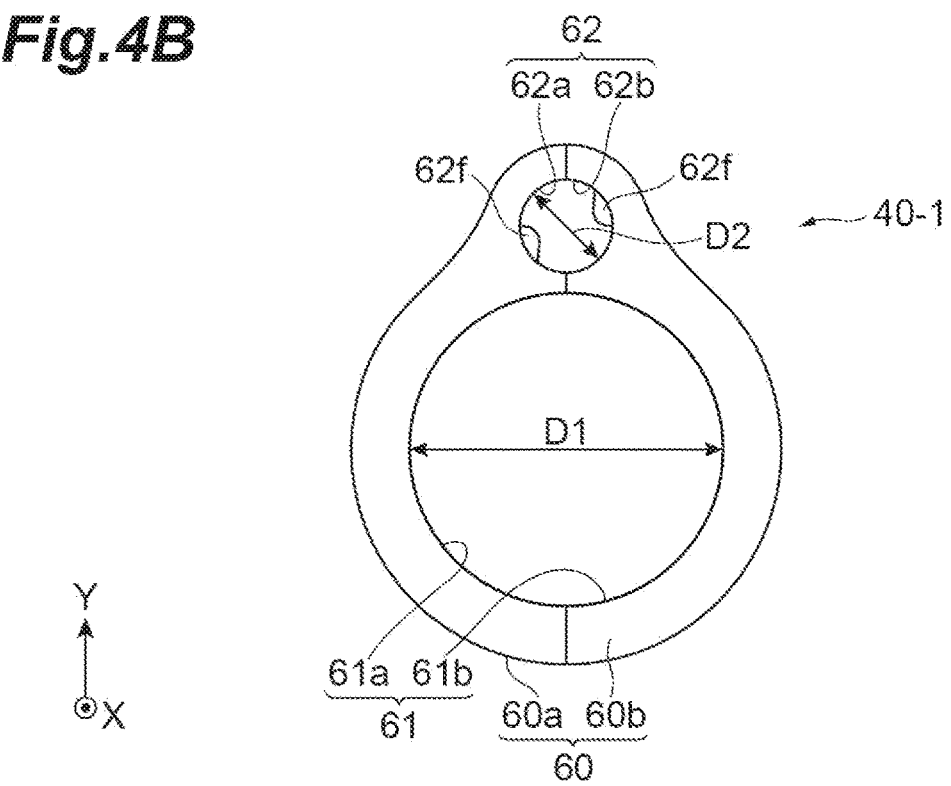
FIG. 4B is a schematic side view illustrating the branch protection case.
Figure 5:
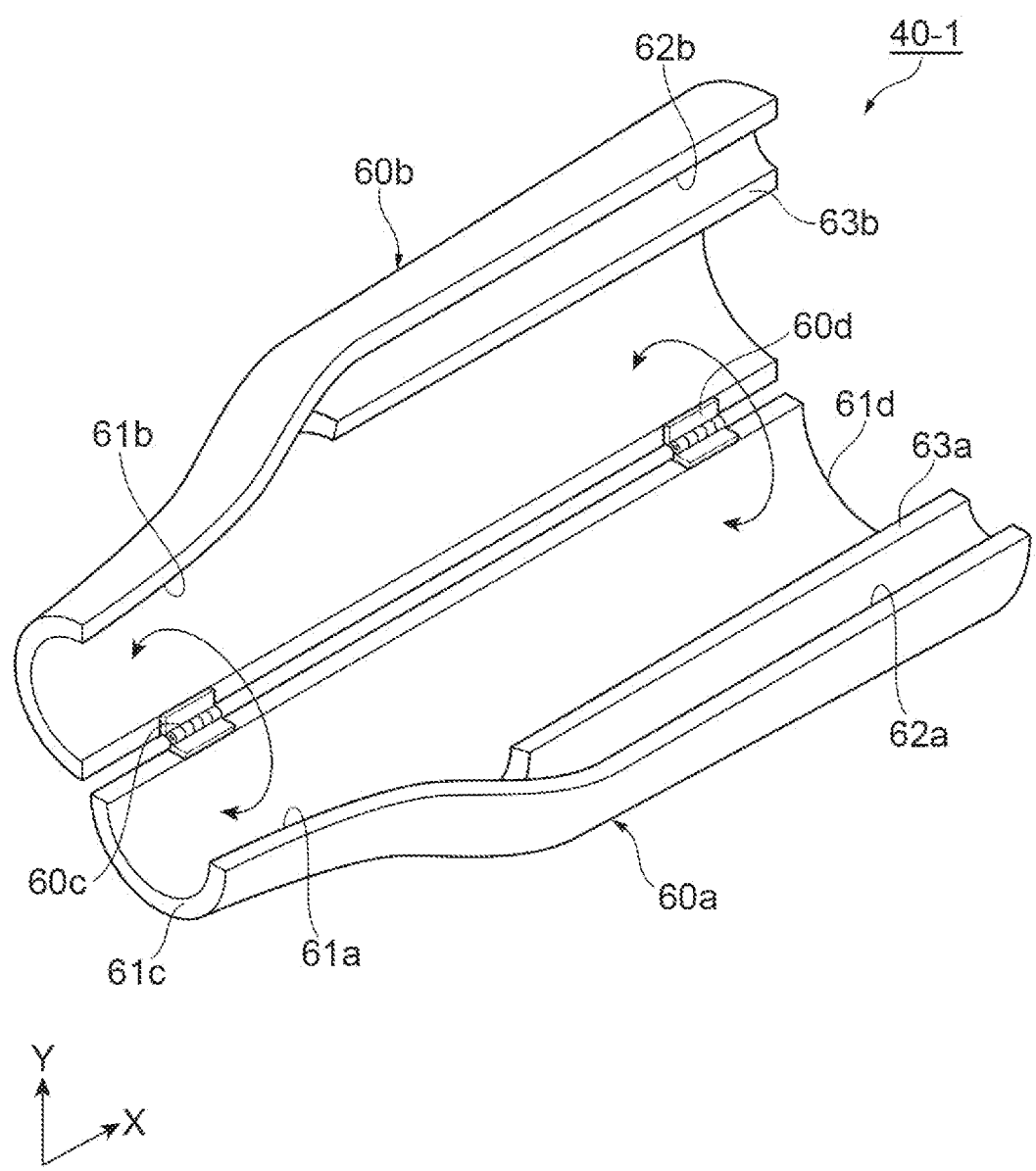
FIG. 5 is a schematic perspective view illustrating an open state of the branch protection case.
Figure 6:
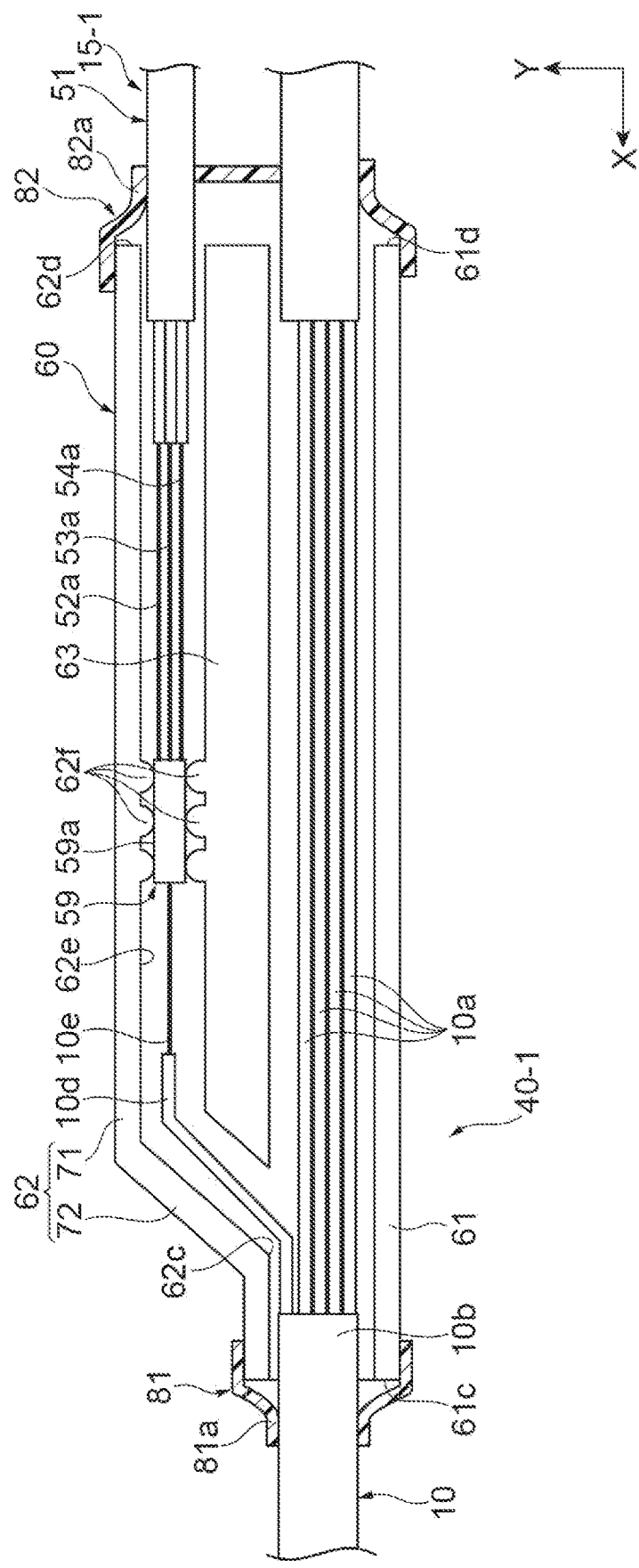
FIG. 6 is a schematic view illustrating a main part of an optical fiber cable to which a branch protection case is attached.

Next, the structure of the branch protection case 40-1 will be described with reference to FIG. 4A, FIG. 4B, FIG. 5 and FIG. 6. FIG. 4A is a schematic perspective view illustrating the branch protection case, and FIG. 4B is a schematic side view illustrating the branch protection case. FIG. 5 is a schematic perspective view illustrating an open state of the branch protection case. FIG. 6 is a schematic view illustrating a main part of an optical fiber cable to which a branch protection case is attached.

As shown in FIGS. 4A, 4B, FIG. 5 and FIG. 6, the branch protection case 40-1 is a member (a case for an optical fiber cable) that protects the branching position of the branched optical fiber cable 15-1 and the portion of the branched optical fiber cable 15-1 where the core wires are exposed. In the present embodiment, the branch protection case 40-1 is also a member that protects the fusion spliced portion between the core wire 10e and the core wires 52a, 53a and 54a. The branch protection case 40-1 is, for example, a resin molded body. At least a part of the branch protection case 40-1 has elasticity. The branch protection case 40-1 includes a main body 60 having a first tube portion 61, a second tube portion 62, and a partition wall 63 partitioning the first tube portion 61 and the second tube portion 62. In the following description, a longitudinal direction of the first tube portion 61 is referred to as a first direction X, and a direction in which the first tube portion 61 and the second tube portion 62 are arranged is referred to as a second direction Y. The second direction Y coincides with one of the inner diameter directions of the first tube portion 61 orthogonal to the first direction X.

The main body 60 is an assembly structure of a first main body portion 60a defining a first part 61a of the first tube portion 61, a first part 62a of the second tube portion 62, and a first part 63a of the partition wall 63, and a second main body portion 60b defining a second part 61b of the first tube portion 61, a second part 62b of the second tube portion 62, and a second part 63b of the partition wall 63. The first main body portion 60a and the second main body portion 60b are rotatably connected to each other by connecting portions 60c and 60d such as hinges. When most or all of the first main body portion 60a and the second main body portion 60b are separated from each other, the branch protection case 40-1 is in an open state. In the open state, a part of the trunk cable 10 and a part of the branch optical fiber cable 15-1 are accommodated in the first main body portion 60a or the second main body portion 60b. Thereafter, when the first main body portion 60a and the second main body portion 60b are connected each other (connection state), the branch protection case 40-1 is mounted on the trunk cable 10 and the branch optical fiber cable 15-1. Although not shown, at least one of the first main body portion 60a and the second main body portion 60b is provided with a mechanism for maintaining the connection state.

The first tube portion 61 is a portion that protects the trunk line of the optical fiber cable 1, extends in the first direction X, and has a cylindrical shape. The one end 61c of the first tube portion 61 in the first direction X is an open end corresponding to one end of the main body 60 in the first direction X. The other end 61d of the first tube portion 61 in the first direction X is an open end corresponding to the other end of the main body 60 in the first direction X. The inner diameter D1 of the first tube portion 61 may be equal to or larger than the thickness of the trunk cable 10. From the viewpoint of preventing rattling between the branch protection case 40-1 and the trunk cable 10 in the connection state, the inner diameter D1 of the first tube portion 61 is, for example, 1.05 times or less the thickness of the trunk cable 10. In the connection state, the trunk cable 10 passes through the first tube portion 61. When at least a part of the trunk cable 10 is accommodated in the first tube portion 61, it can be considered that the trunk cable 10 passes through the first tube portion 61. As described above, a part of the trunk optical fiber cord 10c exposed from the reinforced tube 10b is accommodated in the branch protection case 40-1. Therefore, in the connection state, it can be considered that the trunk optical fiber cord 10c passes through the first tube portion 61. In the present embodiment, a reinforced tube 10b is present at the one end 61c of the first tube portion 61 and the vicinity thereof, and at the other end 61d of the first tube portion 61 and the vicinity thereof.

The second tube portion 62 is a portion for protecting a branch line of the optical fiber cable 1, and is adjacent to the first tube portion 61 in the second direction Y. The second tube portion 62 includes a main tube portion 71 and a connecting tube portion 72 that connects the main tube portion 71 and the first tube portion 61. The main tube portion 71 is a portion that extends in the first direction X and has a cylindrical shape. The connecting tube portion 72 is a portion for communicating with both an interior space of the main tube portion 71 and the interior space of the first tube portion 61. Since the connecting tube portion 72 is provided, the interior space of the second tube portion 62 communicates with the interior space of the first tube portion 61. The one end 62c of the second tube portion 62 in the first direction X is an open end that is included in the connecting tube portion 72 and communicates with the interior space of the first tube portion 61. The one end 62c is located between the one end 61*c* and the other end 61*d* of the first tube portion 61 in the first direction X. The other end 62*d* of the second tube portion 62 in the first direction X is an open end included in the main tube portion 71, and is located closer to the other end 61*d* of the first tube portion 61 than the one end 62*c* of the second tube portion 62 in the first direction X. In the present embodiment, in the first direction X, the position of the other end 61*d* of the first tube portion 61 and the position of the other end 62*d* of the second tube portion 62 are aligned with each other.

The inner diameter D2 of the second tube portion 62 may be equal to or larger than the thickness of the branch optical fiber cable 15-1. Therefore, the inner diameter D1 of the first tube portion 61 is larger than the inner diameter D2. In the connection state, the branch optical fiber cable 15-1 passes through the second tube portion 62. A part of the optical fiber cords 52 to 54 included in the branched optical fiber cable 15-1 is exposed from the reinforced tube 51*a* in the second tube portion 62, and the part is accommodated in the second tube portion 62. Therefore, the optical fiber cords 52 to 54 can be regarded as passing through the second tube portion 62 of the branch protection case 40-1. As described above, the branch optical fiber cord 10*d* is accommodated in the branch protection case 40-1. Therefore, in the connection state, it can be considered that the branch optical fiber cord 10*d* passes through the second tube portion 62.

In this embodiment, a branch optical fiber cord 10*d* is present at the one end 62*c* of the second tube portion 62 and the vicinity thereof, and the branch trunk cable 51 is present at the other end 62*d* of the second tube portion 62 and the vicinity thereof. Between the one end 62*c* and the other end 62*d* of the second tube portion 62, there are the exposed core wires 10*e*, 52*a*, 53*a*, 54*a*, a fusion spliced portion of branch optical fiber cord 10*d*, and optical fiber cords 52 to 54, and a sleeve 59 that protects the fusion spliced portion.

A plurality of projection 62*f* located between the one end 62*c* and the other end 62*d* of the second tube portion 62 in the first direction X are provided on the inner wall 62*e* of the second tube portion 62. The projections 62*f* are ribs projecting toward a center axis of the second tube portion 62, and have elasticity. Each the projection 62*f* is regarded as a part of the second tube portion 62. Therefore, the region where the projections 62*f* are provided in the second tube portion 62 is a reduced diameter region whose inner diameter is smaller than that of the other region. The inner diameter of the reduced diameter region is the same or substantially the same as the outer diameter of the sleeve 59. The projections 62*f* are provided side by side along the first direction X, for example. In addition, the projections 62*f* are provided side by side along the circumferential direction of the inner wall 62*e* when viewed from the first direction X, but is not limited thereto. Viewed from the first direction X, the projections 62*f* may have an annular shape. From the viewpoint of preventing breakage of the branched optical fiber cable 15-1 accommodated in the second tube portion 62, the distal end of the projection 62*f* is rounded.

An outer face 59*a* of the sleeve 59 is sandwiched by projections 62*f* each of which is a part of the second tube portion 62. Accordingly, the movement of the sleeve 59 in the second tube portion 62 is regulated by the projections 62*f*. In the present embodiment, both one end portion and the other end portion of the sleeve 59 in the first direction X are sandwiched by the projections 62*f*.

The partition wall 63 is a member that partitions the first tube portion 61 and the second tube portion 62, and extends from the one end 62*c* of the second tube portion 62 to the other end 62*d* of the second tube portion 62 in the first direction X. Therefore, the interior space of the first tube portion 61 and the interior space of the main tube portion 71 included in the second tube portion 62 are separated from each other. A part of the partition wall 63 functions as a part of an inner wall of the first tube portion 61, and another part of the partition wall 63 functions as a part of the inner wall 62*e* of the second tube portion 62. In the present embodiment, one end of the partition wall 63 in the first direction X functions as a part of the one end 62*c* of the second tube portion 62, and the other end of the partition wall 63 in the first direction X functions as a part of the other end 61*d* of the first tube portion 61 in addition to a part of the other end 62*d* of the second tube portion 62.

As shown in FIG. 6, a first thermal shrinkage tube 81 and a second thermal shrinkage tube 82 are mounted on the trunk cable 10 and the branch protection case 40-1. In FIG. 6, cross sectional views of the first thermal shrinkage tube 81 and the second thermal shrinkage tube 82 are shown. Each of the first thermal shrinkage tube 81 and the second thermal shrinkage tube 82 is a resin member that fixes the position of the branch protection case 40-1 in the optical fiber cable 1. In the present embodiment, each of the first thermal shrinkage tube 81 and the second thermal shrinkage tube 82 is a member (thermal shrinkage member) having a cylindrical shape and exhibiting a thermal shrinkage property. The thermal shrinkage member is a member having a property of shrinking, for example, by heating. From the viewpoint of wearability, a slit may be provided in each of the first thermal shrinkage tube 81 and the second thermal shrinkage tube 82. In this case, each of the first thermal shrinkage tube 81 and the second thermal shrinkage tube 82 may have a C-shaped cross section.

The first thermal shrinkage tube 81 is provided at a position surrounding the one end 61*c* of the first tube portion 61. The inner diameter of the first thermal shrinkage tube 81 may be equal to or larger than one end of the main body 60 in the first direction X. A portion 81*a* of the first thermal shrinkage tube 81 extends away from the first tube portion 61 in the first direction X and surrounds a part of the trunk cable 10. In other words, the portion 81*a* is located on the opposite side of the other end 61*d* through the one end 61*c* of the first tube portion 61 in the first direction X. The second thermal shrinkage tube 82 is provided at a position surrounding the other end 61*d* of the first tube portion 61 and the other end 62*d* of the second tube portion 62. The inner diameter of the second thermal shrinkage tube 82 may be equal to or larger than the other end of the main body 60 in the first direction X. A portion 82*a* of the second thermal shrinkage tube 82 extends away from the first tube portion 61 in the first direction X and surrounds another portion of the trunk cable 10. In other words, the portion 82*a* is located on the opposite side of the one end 61*c* through the other end 61*d* of the first tube portion 61 in the first direction X.

In the optical fiber cable 1, each of the first thermal shrinkage tube 81 and the second thermal shrinkage tube 82 is in a thermally shrunk state. Thus, the first thermal shrinkage tube 81 is in close contact with the one end 61*c* of the first tube portion 61 and a part of the trunk cable 10 located near the one end 61*c*. The second thermal shrinkage tube 82 is in close contact with the other end 61*d* of the first tube portion 61, a part of the trunk cable 10 located near the other end 61*d*, the other end 62*d* of the second tube portion 62, and a part of the branch optical fiber cable 15-1 located near the other end 62*d*.

According to the optical fiber cable 1 of the present embodiment described above, since the partition wall 63 extending from the one end 62*c* of the second tube portion 62 to the other end 62d of the second tube portion 62 is provided, the trunk optical fiber cord 10c and the branch optical fiber cord 10d can be separated from each other in the branch protection case 40-1. Accordingly, it is possible to suppress interference between the trunk optical fiber cord 10c and the branch optical fiber cord 10d in the branch protection case 40-1. In addition, since the one end 62c of the second tube portion 62 communicates with the interior space of the first tube portion 61, the branch start position of the branch optical fiber cord 10d can be covered by the branch protection case 40-1. Accordingly, since the branch protection case 40-1 can satisfactorily protect the branch start position, it is possible to suppress damage to the branch optical fiber cord 10d branched from the trunk optical fiber cord 10c.

In one example, the connecting portion is a fusion spliced portion of the core wire 10e included in the branch optical fiber cord 10d and the core wires 52a, 53a and 54a included in the optical fiber cords 52 to 54. Therefore, the fusion spliced portion can be favorably protected by the branch protection case 40-1.

In one example, the optical fiber cable 1 includes the reinforced tube 10b covering the plurality of optical fiber cords 10a and located at least outside of the branch protection case 40-1, the reinforced tube 51a covering optical fiber cords 52 to 54 and located at least outside of the branch protection case 40-1, the first thermal shrinkage tube 81 as a resin member surrounding at least the one end 61c of the first tube portion 61, and the second thermal shrinkage tube 82 as a resin member surrounding at least the one end 61c of the first tube portion 61, the other end 61d of the first tube portion 61, and the other end 62d of the second tube portion 62, and the resin member is in close contact with at least a part of the branch protection case 40-1, a part of the reinforced tube 10b, and a part of the reinforced tube 51a. In this case, rattling of the branch protection case 40-1 in the optical fiber cable 1 can be suppressed by the resin member.

In one example, the optical fiber cable 1 includes a sleeve 59 covering the connecting portion, and an outer face 59a of the sleeve 59 is sandwiched by the second tube portion 62. Projections 62c located between the one end 62c and the other end 62d of the second tube portion 62 are provided on the inner wall 62e of the second tube portion 62, and the projections 62f are in close contact with the outer face 59a. Therefore, since the movement of the connection portion in the second tube portion 62 can be suppressed, the connection portion is less likely to be damaged.

In one example, the projections 62f have elasticity. For this reason, it is possible to suppress damage to a part of the branched optical fiber cable 15-1 that is in contact with the projections 62f.

In one example, a first thermal shrinkage tube 81 surrounding the one end 61c of the first tube portion 61 and a second thermal shrinkage tube 82 surrounding the other end 61d of the first tube portion 61 and the other end 62d of the second tube portion 62 are provided, the portion 81a of the first thermal shrinkage tube 81 and the portion 82a of the second thermal shrinkage tube 82 extend away from the first tube portion 61 in the first direction X, and the first thermal shrinkage tube 81 is in close contact with the one end 61c of the first tube portion 61 and a part of the trunk cable 10 located near the one end 61c. The second thermal shrinkage tube 82 is in close contact with the other end 61d of the first tube portion 61, a part of the trunk cable 10 located near the other end 61d, the other end 62d of the second tube portion 62, and a part of the branch optical fiber cable 15-1 located near the other end 62d. Therefore, rattling of the branch protection case 40-1 with respect to the optical fiber cable 1 can be suppressed by the first thermal shrinkage tube 81 and the second thermal shrinkage tube 82.

In one example, the branch protection case 40-1 includes a main body 60 having a first tube portion 61, a second tube portion 62, and a partition wall 63, and the main body 60 is an assembly structure of a first main body portion 60a defining a first part 61a of the first tube portion 61, a first part 62a of the second tube portion 62, and a first part 63a of the partition wall 63 and a second main body portion 60b defining a second part 61b of the first tube portion 61, a second part 62b of the second tube portion 62, and a second part 63b of the partition wall 63. Therefore, it is easy to accommodate the trunk cable 10 and the branch optical fiber cable 15-1 in the branch protection case 40-1.

In one example, the branch protection case 40-1 includes connecting portions 60c and 60d that connect the first main body portion 60a and the second main body portion 60b. Therefore, the first main body portion 60a and the second main body portion 60b can be easily assembled. In addition, it is possible to suppress loss of either the first main body portion 60a or the second main body portion 60b.

Figure 7:
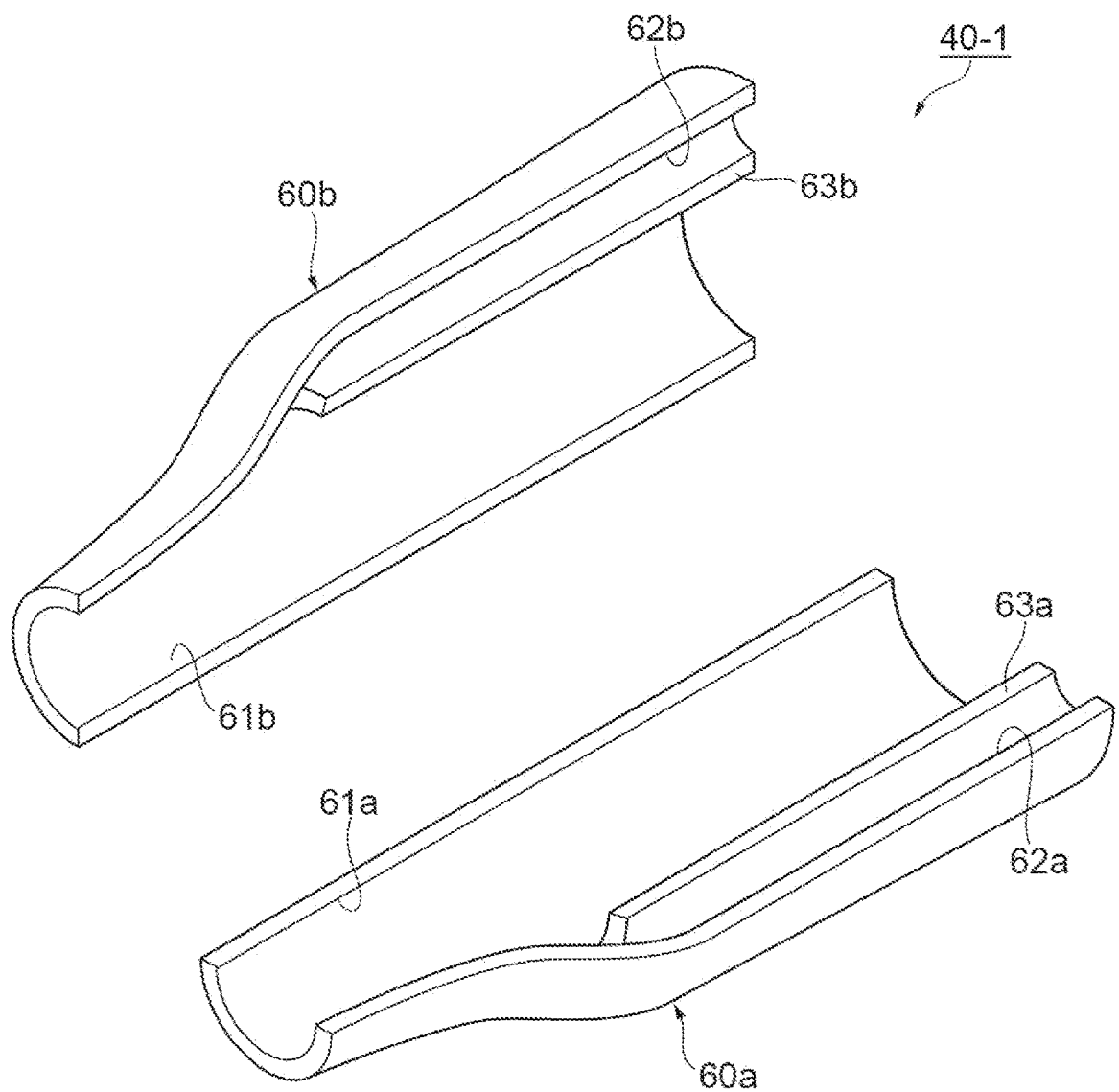
FIG. 7 is a schematic perspective view illustrating a branch protection case according to a modification.

The branch protection case and the optical fiber cable including the same according to the present disclosure are not limited to the above-described embodiments, and may be variously modified. For example, the first main body portion and the second main body portion included in the above-described embodiment are connected to each other by the connecting portion, but are not limited thereto. FIG. 7 is a schematic perspective view illustrating a branch protection case according to a modification. As shown in FIG. 7, the first main body portion 60a and the second main body portion 60b may be separate from each other.

In the above-described embodiment, the optical fiber cable includes the first heat shrinkable tube and the second heat shrinkable tube as a resin member for one branch protection case, but is not limited thereto. For example, the resin member may not have a thermal shrinkage property. The optical fiber cable may include a resin member that surrounds at least one end of the first tube portion, the other end of the first tube portion, and the other end of the second tube portion. For example, the resin member for one branch protection case may be a single tube, tape, or the like. In the former case, for example, the resin member covers and adheres to the branch protection case and the reinforced tube of each cable. In the latter case, for example, the resin member may be a wound body wound around the branch protection case and the reinforced tube of each cable. Note that two or more tapes may be wound for one branch protection case. These wound bodies and tapes may have a thermal shrinkage property. Even in these cases, the rattling of the branch protection case with respect to the optical fiber cable is suppressed.

In the above-described embodiment, the branch trunk cable is fusion-spliced to the second optical fiber cord, but is not limited thereto. For example, the branch trunk cable and the second optical fiber cord may be connected to each other by a connector or the like. In any case, the optical connecting portion between the branch trunk cable and the second optical fiber cord is accommodated in the second tube portion.

Although the projections integrated with the inner wall of the second tube portion are provided in the above-described embodiment, the present disclosure is not limited thereto. The projections may be separate from the second tube portion. In this case, the projections are fixed on the inner wall of the second tube portion via an adhesive or the like.

What is claimed is:

1. An optical fiber cable comprising:
a plurality of first optical fiber cords including a trunk optical fiber cord and a branch optical fiber cord;
a second optical fiber cord connected to the branch optical fiber cord; and
a case covering a part of the plurality of first optical fiber cords and a part of the second optical fiber cord,
wherein the case includes:
   a first tube portion through which the trunk optical fiber cord is passed;
   a second tube portion adjacent to the first tube portion and through which the branch optical fiber cord is passed; and
   a partition wall partitioning the first tube portion and the second tube portion,
wherein an optical connecting portion of the branch optical fiber cord and the second optical fiber cord is accommodated in the second tube portion,
wherein a first end of the second tube portion is located between a first end of the first tube portion and a second end of the first tube portion, the first end of the second tube portion communicating with an interior space of the first tube portion, and
wherein the partition wall extends from the first end of the second tube portion to a second end of the second tube portion.

2. The optical fiber cable according to claim 1, further comprising:
a first tube located at least outside the case, the first tube covering the plurality of first optical fiber cords;
a second tube located at least outside the case, the second tube covering the second optical fiber cord; and
a resin member surrounding at least the first end of the first tube portion, the second end of the first tube portion, and the second end of the second tube portion,
wherein the resin member is in contact with at least a part of the case, a part of the first tube, and a part of the second tube.

3. The optical fiber cable according to claim 2, wherein the resin member has a thermal shrinkage property.

4. The optical fiber cable according to claim 1,
wherein the case includes a body including the first tube portion, the second tube portion, and the partition wall, and
wherein the body is an assembly structure of a first main body portion and a second main body portion, the first main body portion defining a first part of the first tube portion, a first part of the second tube portion, and a first part of the partition wall, and the second main body portion defining a second part of the first tube portion, a second part of the second tube portion, and a second part of the partition wall.

5. The optical fiber cable according to claim 4, further comprising a connecting portion connecting the first main body portion and the second main body portion.

6. The optical fiber cable according to claim 1, further comprising a sleeve covering the optical connecting portion,
wherein an outer face of the sleeve is sandwiched by the second tube portion.

7. The optical fiber cable according to claim 6,
wherein a projection located between the first end and the second end of the second tube portion is provided on an inner wall of the second tube portion, and
wherein the projection is in contact with the outer face.

8. The optical fiber cable according to claim 7, wherein the projection has elasticity.

* * * * *